United States Patent
Hu et al.

(10) Patent No.: US 11,991,531 B2
(45) Date of Patent: May 21, 2024

(54) COMMUNICATION LOAD FORECASTING ACCURACY WITH ADAPTIVE FEATURE BOOSTING

(71) Applicant: SAMSUNG ELECTRONICS CO., LTD., Suwon-si (KR)

(72) Inventors: Chengming Hu, Montreal (CA); Xi Chen, Montreal (CA); Ju Wang, Montreal (CA); Hang Li, Montreal (CA); Jikun Kang, Montreal (CA); Yi Tian Xu, Montreal (CA); Xue Liu, Montreal (CA); Di Wu, Montreal (CA); Seowoo Jang, Seoul (KR); Intaik Park, Seoul (KR); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 191 days.

(21) Appl. No.: 17/570,767

(22) Filed: Jan. 7, 2022

(65) Prior Publication Data

US 2022/0338019 A1     Oct. 20, 2022

Related U.S. Application Data

(60) Provisional application No. 63/174,872, filed on Apr. 14, 2021.

(51) Int. Cl.
| | |
|---|---|
| *H04W 16/22* | (2009.01) |
| *G06N 3/047* | (2023.01) |
| *H04L 41/14* | (2022.01) |
| *H04L 41/147* | (2022.01) |
| *H04L 41/16* | (2022.01) |

(Continued)

(52) U.S. Cl.
CPC ............ *H04W 16/22* (2013.01); *G06N 3/047* (2023.01); *H04L 41/145* (2013.01); *H04L 41/147* (2013.01); *H04L 41/16* (2013.01); *H04W 24/02* (2013.01); *H04W 24/08* (2013.01)

(58) Field of Classification Search
CPC ..... H04W 16/22; H04W 24/02; H04W 24/08; H04W 24/04; G06N 3/047; G06N 3/045; G06N 3/084; G06N 20/20; H04L 41/145; H04L 41/147; H04L 41/16
See application file for complete search history.

(56) References Cited

U.S. PATENT DOCUMENTS

| | | | |
|---|---|---|---|
| 9,538,401 B1 * | 1/2017 | Ouyang | ................ H04W 16/22 |
| 2008/0225739 A1 | 9/2008 | Toomey et al. | |

(Continued)

FOREIGN PATENT DOCUMENTS

KR    10-2005-0077516 A    8/2005

*Primary Examiner* — Shean Tokuta
*Assistant Examiner* — Juan C Turriate Gastulo
(74) *Attorney, Agent, or Firm* — Sughrue Mion, PLLC

(57) ABSTRACT

A method is provided. The method includes receiving a first dimension set, extracting a first latent feature set from the first dimension set, training a first base predictor based on the first feature set, generating a second dimension set based on the first dimension set, the second dimension set having fewer dimensions than the first dimension set, extracting a second latent feature set from the second dimension set, training a second base predictor based on the second feature set, and generating a traffic prediction based on the first base predictor and the second base predictor.

17 Claims, 7 Drawing Sheets

(51) Int. Cl.
*H04W 24/02* (2009.01)
*H04W 24/08* (2009.01)

(56) References Cited

U.S. PATENT DOCUMENTS

| | | |
|---|---|---|
| 2010/0034102 A1 | 2/2010 | Wang et al. |
| 2010/0150004 A1* | 6/2010 | Duffield ................. H04L 41/12 370/252 |
| 2018/0048530 A1* | 2/2018 | Nikitaki ................ H04L 43/087 |
| 2019/0124045 A1* | 4/2019 | Zong ........................ G06N 7/01 |
| 2020/0036639 A1* | 1/2020 | Huberman ............ H04L 41/149 |
| 2020/0136975 A1* | 4/2020 | Arora .................... H04L 43/045 |
| 2023/0164629 A1* | 5/2023 | Rydén ................... H04W 28/08 455/453 |

\* cited by examiner

COMMUNICATION LOAD FORECASTING ACCURACY WITH ADAPTIVE FEATURE BOOSTING

CROSS-REFERENCE TO RELATED APPLICATION(S)

This application is based on and claims priority under 35 U.S.C. § 119 to U.S. Provisional Application No. 63/174,872, filed on Apr. 14, 2021, the disclosure of which is incorporated herein by reference in its entirety.

BACKGROUND

1. Field

The disclosure relates generally to a system and method for improving communication load.

2. Description of Related Art

Delays, such as sensing, computing and actuation delays, exist in the Operations, Administration and Management (OAM) plane of wireless communication systems. The delays may cause potentially large system performance degradation. Sensing delays undermine the system's ability to collect timely information for OAM decision making. Computing and actuation delays cause the OAM actions to become out-of-date when deployed. Computations and actuations being performed with obsolete information and executed at the wrong time cause an OAM decision to be potentially useless and even harmful.

A neural network may utilize its front layers to extract latent features (i.e., intermediate representations) from a multi-dimensional input tensor (e.g., a vector of historical load values), and then may map these features into the final prediction value with the rear layers. However, in existing approaches, the latent features are trained and tuned to minimize a pre-defined loss, such as the mean absolute error (MAE) of the forecast load. Consequently, the extracted latent features only capture the input dimensions that are most sensitive to this loss, and may ignore some hidden yet informative dimensions. As a result, these latent features may lose the ability to properly represent and utilize at least some of the input dimensions, leading to potential degradation of forecasting performance.

SUMMARY

In accordance with an aspect of the disclosure, a method may include receiving a first dimension set, extracting a first latent feature set from the first dimension set, training a first base predictor based on the first feature set, generating a second dimension set based on the first dimension set, the second dimension set having fewer dimensions than the first dimension set, extracting a second latent feature set from the second dimension set, training a second base predictor based on the second feature set, and generating a traffic prediction based on the first base predictor and the second base predictor.

In accordance with an aspect of the disclosure, a system may include a memory storing instructions and a processor configured to execute the instructions to receive a first dimension set, extract a first latent feature set from the first dimension set, train a first base predictor based on the first feature set, generate a second dimension set based on the first dimension set, the second dimension set having fewer dimensions than the first dimension set, extract a second latent feature set from the second dimension set, train a second base predictor based on the second feature set, and generate a traffic prediction based on the first base predictor and the second base predictor.

In accordance with an aspect of the disclosure, a non-transitory computer readable storage medium may store instructions that, when executed, cause at least one processor to receive a first dimension set, extract a first latent feature set from the first dimension set, train a first base predictor based on the first feature set, generate a second dimension set based on the first dimension set, the second dimension set having fewer dimensions than the first dimension set, extract a second latent feature set from the second dimension set, train a second base predictor based on the second feature set, and generate a traffic prediction based on the first base predictor and the second base predictor.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
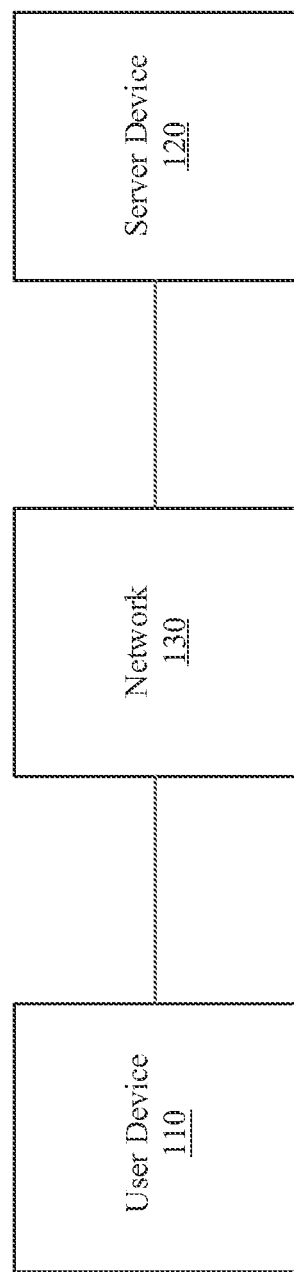
FIG. 1 is a diagram of devices of a system according to an embodiment.

FIG. 1 is a diagram of a system according to an embodiment. FIG. 1 includes a user device 110, a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 120 includes one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
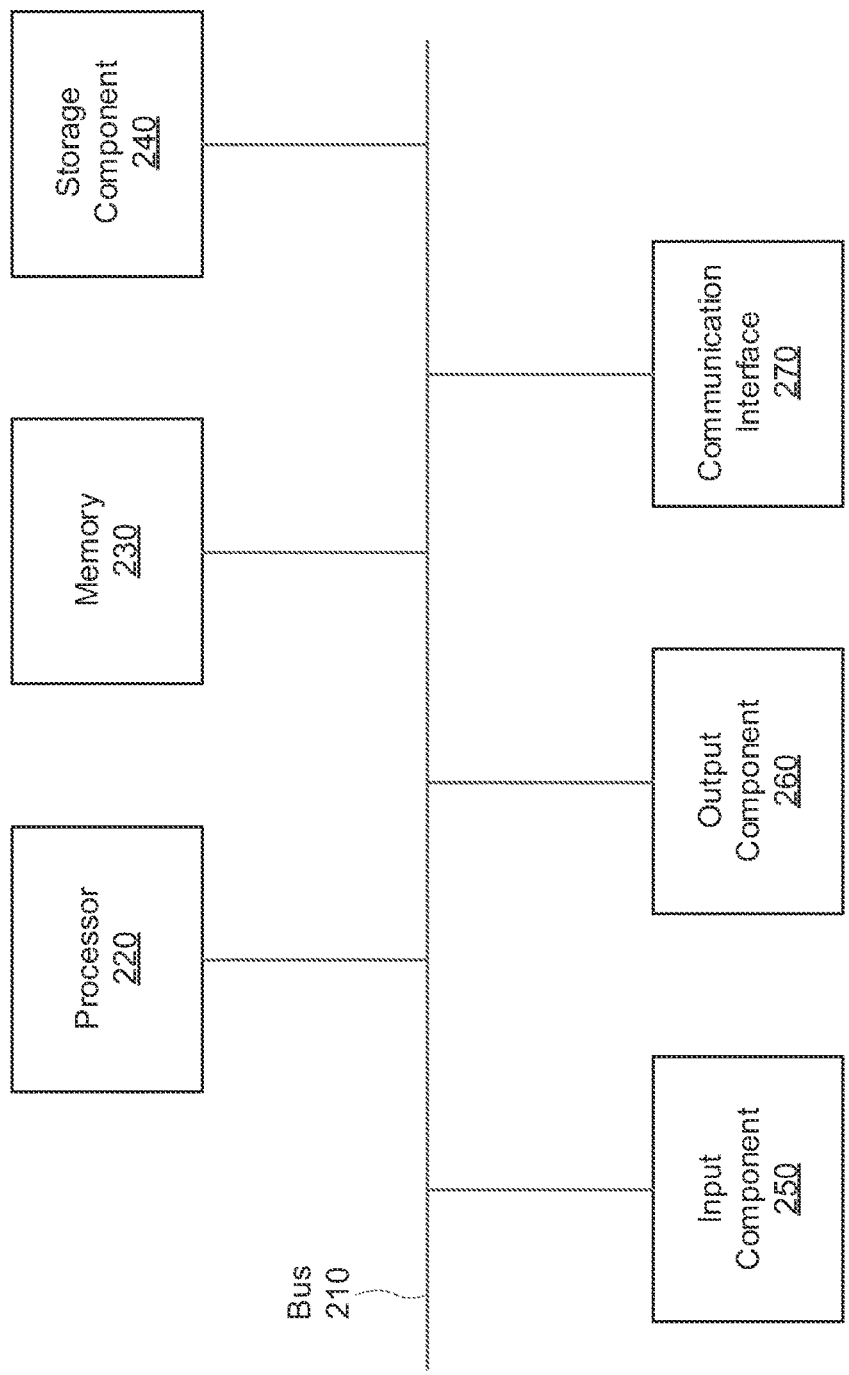
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Provided herein are a system and method that utilize an adaptive dimension boosting (AFB) approach to ensure that the extracted latent features capture and represent each input in a robust way. Embodiments of the disclosure utilize a series of Autoencoders (AEs) to extract latent features that are useful for reconstructing each dimension on the inputs. The AEs may be organized in a recurrent structure, where every AE reconstructs its inputs and down-samples the dimensions of the inputs for the next AE. If the reconstruction error of an input dimension is low, then the dimension has a lower chance of being sampled and used for the next AE. The AEs may be configured to recursively minimize the residual reconstruction errors of all the input dimensions. In embodiments of the disclosure, the AFB approach extracts one set of latent features with each AE. The sets of latent features are complimentary to each other, and together provide a comprehensive representation covering every input dimension. Using the extracted sets of latent features, the AFB approach trains a series of base predictors, each of which forecasts the future load using one set of dimensions. The prediction outputs of these base predictors are aggregated by an ensemble module to produce the final forecast load.

Figure 3:
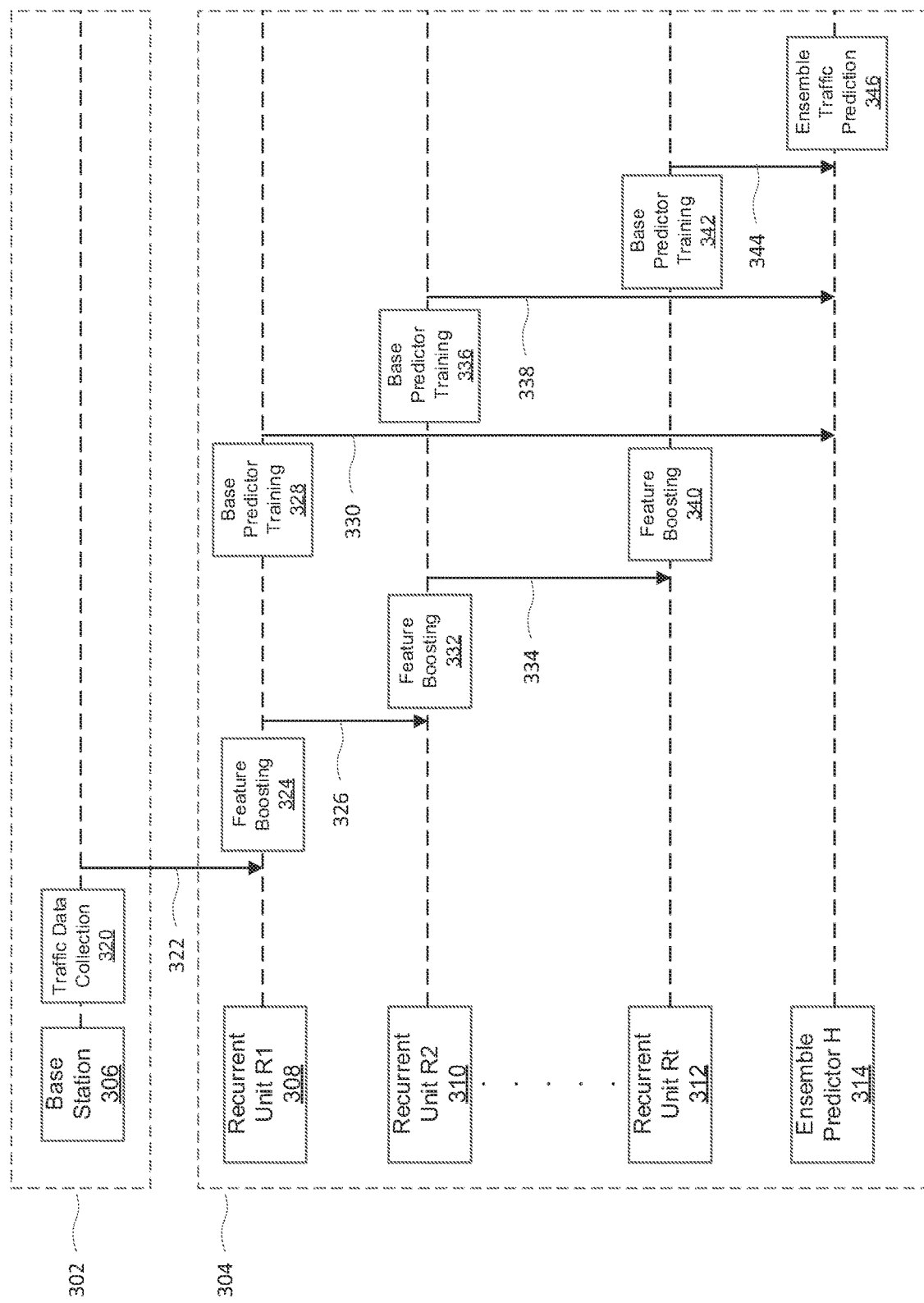
FIG. 3 is a diagram of a system for predicting traffic, according to an embodiment.

FIG. 3 is a diagram of a system for predicting traffic, according to an embodiment. The system includes a control module 302 and a prediction module 304. The control module 302 includes a base station 306. The prediction module 304 includes a first recurrent unit 308, a second recurrent unit 310, a final recurrent unit 312 and an ensemble predictor 314. Although three recurrent units are depicted, embodiments of the disclosure may include more or fewer recurrent units as will be understood by one of ordinary in the art from the disclosure herein.

The base station 320 may perform traffic data collection 320, and, at 322, sends a first dimension set to the first recurrent unit 308. In the dimension set, each sample may include multiple dimensions that represent historical traffic load, as well as the time stamp (e.g., day, hour, minute, etc.). The first recurrent unit 308 may perform feature boosting 324 based on the first dimension set, generate a second dimension set, and, at 326, send the second dimension set to the second recurrent unit 310. The first recurrent unit 308 may perform base predictor training 328 based on the first dimension set, and, at 330, send a first prediction result to the ensemble predictor 314.

The second recurrent unit 310 may perform feature boosting 332 based on the second dimension set, generate a third dimension set, and, at 334, send the third dimension set to the final recurrent unit 312. The second recurrent unit 310 may perform base predictor training 336, and, at 338, send a second prediction result to the ensemble predictor 314. The final recurrent unit 312 may perform feature boosting 340 based on the third dimension set. The final recurrent unit 312 may perform base predictor training 342, and, at 344, send a third prediction result to the ensemble predictor 314. The ensemble predictor 314 may generate an ensemble traffic prediction 346 based on the first, second and third prediction results.

Figure 4:
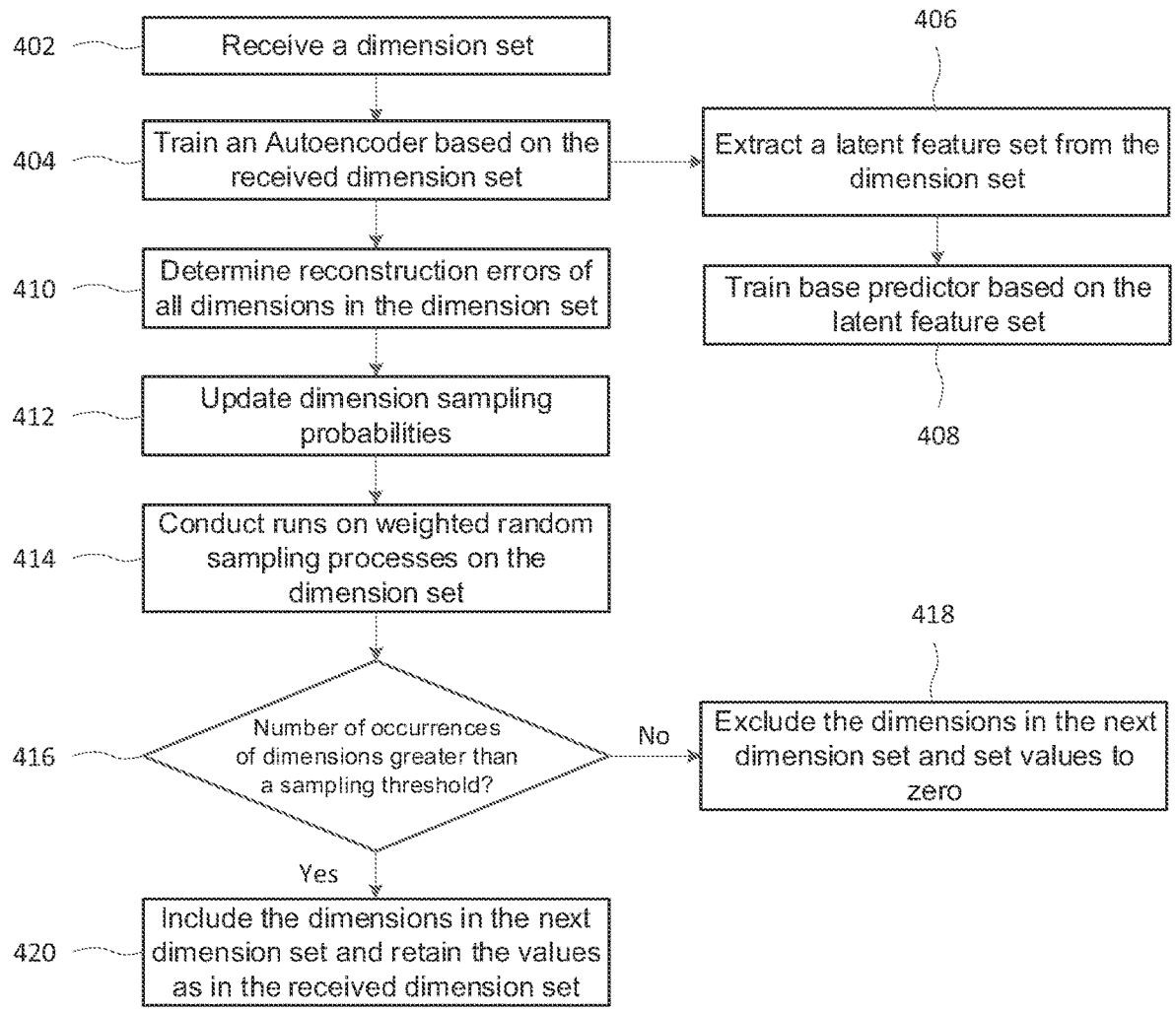
FIG. 4 is a flowchart of a method for predicting traffic, according to an embodiment.

FIG. 4 is a flowchart of a method for predicting traffic, according to an embodiment. In operation 402, the system receives a dimension set. In operation 404, the system trains an AE based on the received dimension set. In operation 406, the system extracts a latent feature set from the dimension set. At 408, the system trains a base predictor based on the latent feature set.

In operation 410, the system determines reconstruction errors of all dimensions in the dimension set. In some embodiments, each recurrent unit is provided with an AE that is used to reduce the reconstruction error between the original input and the reconstructed output. Given a dataset including M dimensions, the reconstruction error may be minimized, as in Equation (1):

$$\min \sum_{m=1}^{M} l(x_m, \hat{x}_m), \quad (1)$$

where $\hat{x}_m$ and $l(x_m, \hat{x}_m)$ are the reconstructed output and the reconstruction error of the m-th dimension, respectively. One AE may include an encoder and a decoder. The encoder may compress the original dimension set into a small representation by weights and perform biasing to layers until the intermediate layer is reached. The intermediate layer may be one hidden layer and may indicate the middle hidden layer. The representation in the intermediate layer may be employed as the latent feature set. The decoder may reconstruct an output layer from the hidden representation by the other weights and then perform biasing. To optimize the AE, the reconstruction error between the input and output may be minimized as shown in Equation (1). The objective function is optimized by tuning all weights and then performing biasing in the back propagation direction. Once all the network parameters are determined, the intermediate hidden layer may represent the original feature information and may be utilized as the latent feature set.

Once an AE is trained, the output of the intermediate layer may include highly representative information of the original dimensions, and may be utilized as the extracted dimension representation for different tasks.

In some embodiments, instead of training a single AE on the whole dimensions, the system may generate boosted dimension sets to train multiple AEs individually, with each dimension set being a subset of the previous dimension set. For example, for a dataset D including M dimensions and N samples, the first AE may be trained on the dataset D including all dimensions, such that all dimensions are included in the training of the first AE. Once the first AE is trained, the extracted features may be utilized to train a base predictor. The reconstruction error of m-th dimension may be calculated as in Equation (2):

$$l(x_m, \hat{x}_m) = \frac{1}{N} \sum_{i=1}^{N} (x_{mi} - \hat{x}_{mi})^2 \quad (2)$$

where $\hat{x}_{mi}$ is the m-th reconstructed dimension of the i-th sample.

In one embodiment, the dimension down-sampling is developed to improve the reconstruction of the dimensions that are difficult to reconstruct by promoting their presence in the training of subsequent AEs. The system may perform the down-sampling by a weighted random sampling with replacement based on the reconstruction errors.

In operation 412, the system updates dimension sampling probabilities. The sampling probabilities of all dimensions may be initialized to be equal to $$P_1(m) = \frac{1}{M}.$$

Once the reconstruction errors of all dimensions are obtained, the system may identified the dimension subset of $D_1$ that includes the dimensions that are difficult to reconstruct and increase their presence in the training of a subsequent AE.

The dimension sampling probability of each dimension in a first recurrent unit may be updated as in Equation (3):

$$P_2(m) = \frac{P_1(m)\sqrt{\frac{l(x_m, \hat{x}_m)}{1 - l(x_m, \hat{x}_m)}}}{Z_1} \quad (3)$$

where, as in Equation (4).

$$Z_1 = \sum_{m=1}^{M} \left[ P_1(m) \sqrt{\frac{l(x_m, \hat{x}_m)}{1 - l(x_m, \hat{x}_m)}} \right] \quad (4)$$

Equation (4) represents the normalization factor to ensure the sum of $P_2(m)$ to be equal to 1. Given the sampling probabilities $P_2(m)$ of all dimensions, the system may generate a new dimension set in the weighted random sampling process and the new dimension set may be utilized to train a subsequent AE in a second recurrent unit.

In operation 414, the system conducts Q runs weighted random sampling processes on the dimension set. Without loss of generality, at the (t+1)-th recurrent unit, the AE may be trained on the corresponding dimension set $D_{t+1}$, which is sampled from $D_t$ according to the sampling probability $P_{t+1}(m)$, determined by the reconstruction error of the AE for each dimension in $D_t$, as in Equation (5).

$$P_{t+1}(m) = \begin{cases} \dfrac{P_t(m)\sqrt{\dfrac{l(x_m, \hat{x}_m)}{1 - l(x_m, \hat{x}_m)}}}{Z_t}, & \text{if } x_m \text{ is sampled at } t\text{-th unit} \\ \dfrac{P_t(m)}{Z_t}, & \text{if } x_m \text{ is unsampled at } t\text{-th unit.} \end{cases} \quad (5)$$

In operation 416, the system determines whether a number of occurrences of dimensions is greater than a sampling threshold. In operation 418, based on the number of occurrences being less than or equal to the sampling threshold, the system excludes the dimensions in the next dimension set and sets the values of the excluded dimensions to zero. In operation 420, based on the number of occurrences being greater than the sampling threshold, the system includes the dimensions in the next dimension set and retains the values as in the received initial dimension set.

Given the sampling probability $P_{t+1}(m)$ for all dimensions, the system may independently sample the dimension set $D_t$ for M times and record whether the dimensions are sampled in the process. Any dimensions $x_m \in D_t$ that have been sampled in one run may keep the same probabilities to be sampled in the next run. In order to reduce the uncertainty in the random dimension sampling process, the system may repeat this sampling process with Q runs at each recurrent unit. Any dimension $x_m \in D_t$ whose occurrences of being sampled is greater than a fixed threshold β may be present in the new dimension set $D_{t+1}$ (i.e., operation 420). Otherwise, it is dropped from the new dimension set $D_{t+1}$ (i.e., operation 418).

The distribution of the new dimension set $D_{t+1}$ is proportional to the distribution of the sampling probability $P_{t+1}(m)$. Dimensions with larger probabilities, or larger reconstruction errors, may have a greater chance to be present in the dimension set $D_{t+1}$. The dimension sampling process may non-deterministic.

For the dimensions that are present in the dimension set $D_{t+1}$, their values in $D_t$ may be retained in $D_{t+1}$ For those absent dimensions, their values in $D_{t+1}$ are set to zero. In this way, these absent dimensions will not participate in the training of the new AE.

In some embodiments, from each $D_t$, a latent feature set may be extracted by the AE. The system may train, based on each extracted dimension set a base predictor, which leads to an array of base predictors whose results may be consistent or conflicting. To combine their results for the final decision, the system may utilize ensemble learning to integrate the decisions from multiple base predictors. By combining the base predictors systematically, the ensemble predictor may integrate the advantages of, and eliminate the bias among, these predictors to boost the final performance.

Figure 5:
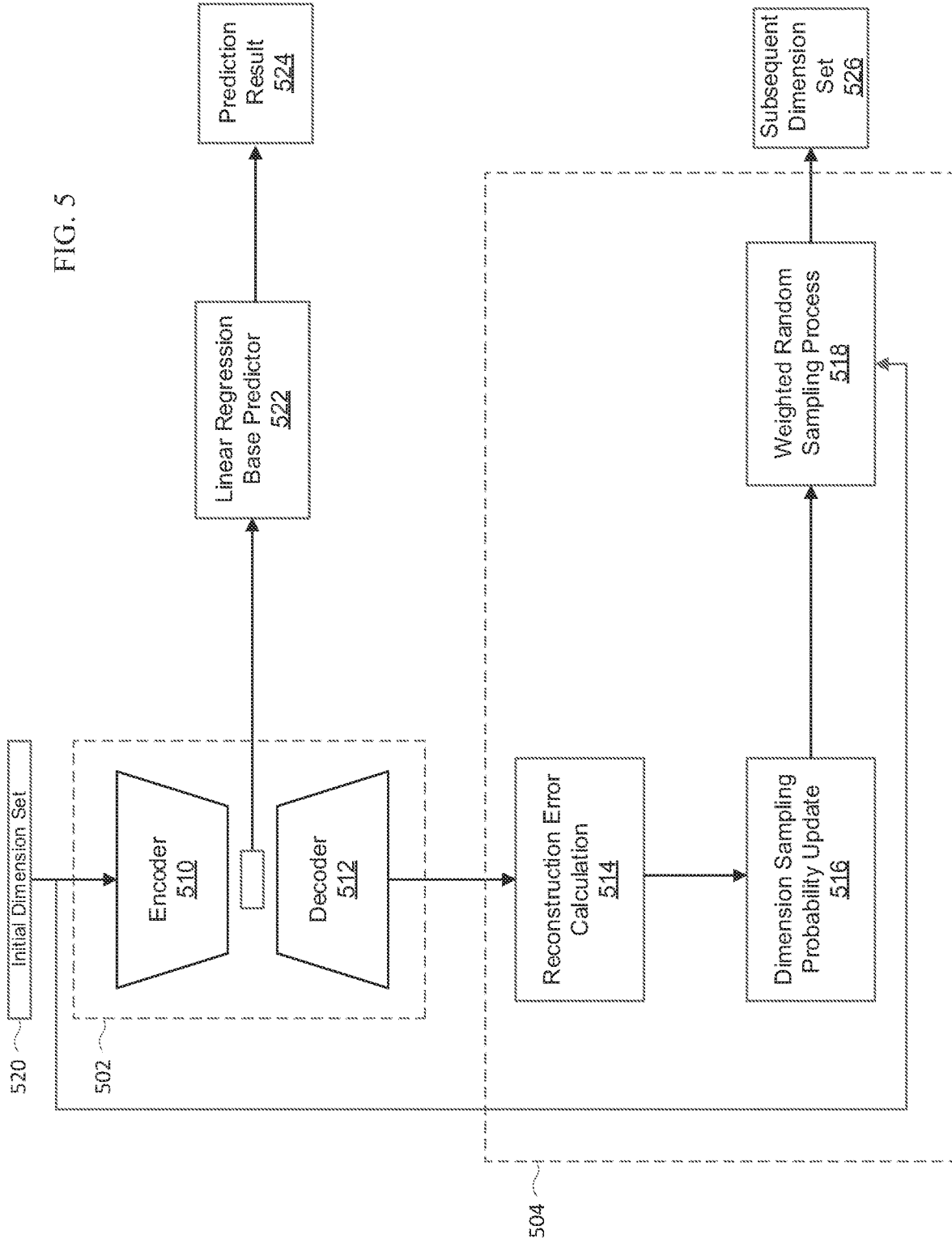
FIG. 5 is a diagram of a recurrent unit, according to an embodiment.

FIG. 5 is a diagram of a recurrent unit, according to an embodiment. The recurrent unit includes an AE 502 and a feature boosting component 504. The AE 502 includes an encoder 510 and a decoder 512. The feature boosting component 504 may include a reconstruction error calculation block 514, a dimension sampling probability update block 516, and a weight random sampling process block 518.

The recurrent unit may receive an initial dimension set 520. The AE 502 may receive the initial dimension set 520 and extract latent features from the dimension set 520 with the encoder 520. The recurrent unit may train a linear regression base predictor 522 with the extracted latent features, and the generate a prediction result 524.

The feature boosting component 504 may receive reconstructed dimensions output from the decoder 512 of the AE 502 and calculate the reconstruction error at the reconstruction error calculation block 514. The feature boosting component 504 may use the reconstructed errors to update a dimension sampling probability at the dimension sampling probability update block 516. The feature boosting component may perform a weighted random sampling process at the weighted random sampling process block 518, based on the dimension sampling probability and the initial dimension set 520, to produce a subsequent dimension set 526.

Figure 6:
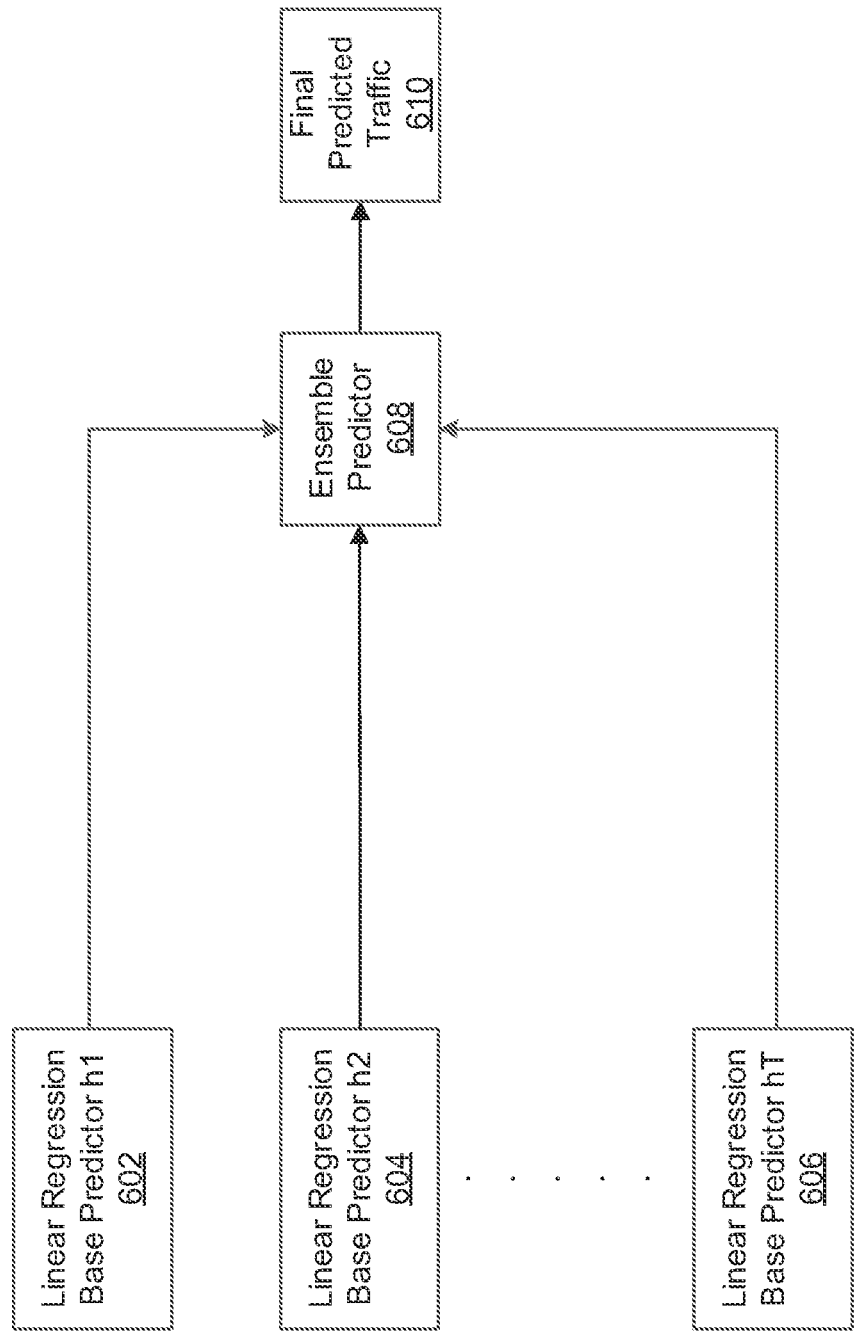
FIG. 6 is a diagram of ensemble prediction component, according to an embodiment.

FIG. 6 is a diagram of ensemble prediction component, according to an embodiment. In one embodiment, the ensemble prediction component may include a first linear regression base predictor 602, a second linear regression base predictor 604, and a final linear regression base predictor 606. Although three base predictors are depicted, embodiments may include fewer or more base predictors as will be understood by one of ordinary in the art from the disclosure herein. Each base predictor outputs a prediction to an ensemble predictor 608. Based on all received predictions, the ensemble predictor 608 may generate a final predicted traffic 610.

One example embodiment of a process for predicting traffic is provided in Table 1.

TABLE 1

| Algorithm 1 Adaptive Feature Boosting |
|---|
| 1: Input: Dataset D, with M-dimensional data points (e.g., {$x_1, x_2, ..., x_M$}), Number of sampling runs Q, Sampling threshold B. |
| 2: Initialization: |
| 3:   Dimension sampling probability $P_1(m) = 1/M$; |
| 4:   $D_1 = D$; |
| 5: Training: |
| 6: while not converge do |
| 7:   for every recurrent unit $R_t$ (t = 1, 2, ..., T) do |
| 8:     Train a new feature extractor $E_t$ on $D_t$; |
| 9:     Extract the latent features $F_t$ from $D_t$; |
| 10:    Train a base predictor $h_t$ on the latent feature set $F_t$; |
| 11:    Calculate the reconstruction errors of all the dimensions according to Eqn. (2); |
| 12:    Update the dimension probabilities {$P_{t+1}(m)$} according to Eqn. (5); |
| 13:    Conduct Q runs of weighted random sampling (with replacement) processes on $D_t$ using {$P_{t+1}(m)$}; |
| 14:    Generate a new date set $D_{t+1}$ that only contains the dimensions whose numbers of occurrences are larger than a sampling threshold B; |
| 15:  end for |
| 16: end while |
| 17: Integrate the base predictors {$h_t$} into the ensemble predictor H(x). |
| 18: Output: The whole trained AFB structure, including the sampling probabilities, {$P_t(m)$}, the trained AEs $E_t$, the trained base predictors {$h_t$}, and the trained ensemble predictor H(x). |

Figure 7:
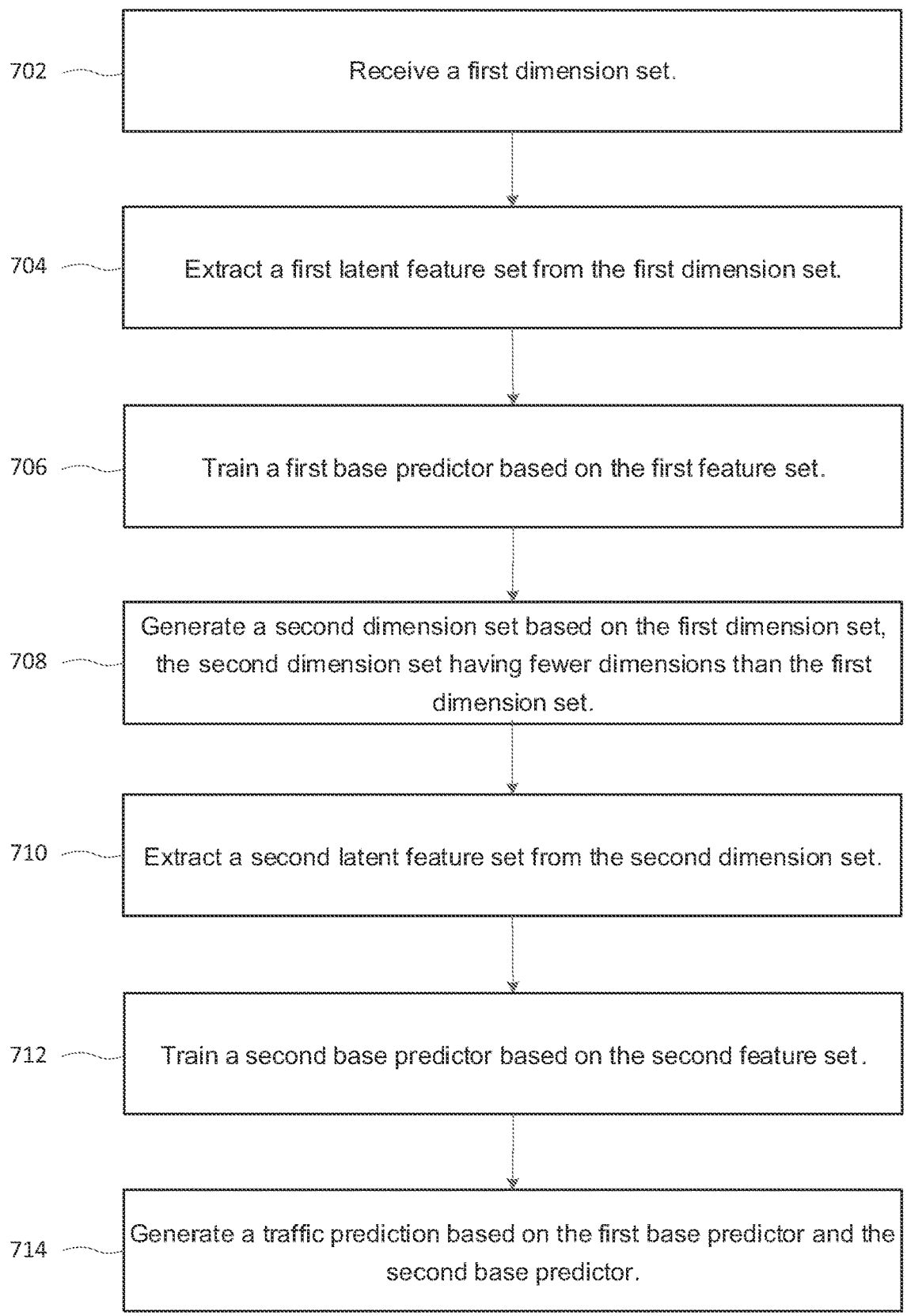
FIG. 7 is a flowchart of a method of predicting traffic, according to an embodiment.

FIG. 7 is a flowchart of a method of predicting traffic, according to an embodiment. In operation 702, the system receives a first dimension set. In operation 704, the system extracts a first latent feature set from the first dimension set. In operation 706, the system trains a first base predictor based on the first feature set. In operation 708, the system generates a second dimension set based on the first dimension set, the second dimension set having fewer dimensions than the first dimension set. In operation 710, the system extracts a second latent feature set from the second dimension set. In operation 712, the system trains a second base predictor based on the second feature set. In operation 714, the system generates a traffic prediction based on the first base predictor and the second base predictor.

The traffic prediction may include a per-resource prediction and may be conducted on each base station of the system. The inputs of the traffic prediction may include available historical records, such as traffic loads and time stamp. The prediction model may output the future traffic. For example, the traffic prediction may be utilized in 5G load/traffic balancing, which migrates user equipments (UEs) from one base station to another base station such that the future loads at different base stations are balanced. The traffic prediction may also be used for predictive dynamic bandwidth allocation, which pre-allocates the bandwidth resources to a base station based on the traffic prediction.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving a first dimension set;
    extracting a first latent feature set from the first dimension set;
    training a first base predictor based on the first latent feature set;
    generating a second dimension set based on the first dimension set, the second dimension set having fewer dimensions than the first dimension set;
    extracting a second latent feature set from the second dimension set;
    training a second base predictor based on the second latent feature set; and
    generating a traffic prediction based on the first base predictor and the second base predictor,
    wherein generating the second dimension set comprises:
        sampling each dimension in the first dimension set with a predetermined number of runs; and
        determining that dimensions in the first dimension set with a number of occurrences in the predetermined number of runs that is greater than a sampling threshold are to be included in the second dimension set.

2. The method of claim 1, wherein generating the second dimension set comprises:
    determining reconstruction errors for each dimension in the first dimension set; and
    updating dimension probabilities for each dimension in the first dimension set based on the reconstruction errors.

3. The method of claim 1, wherein sampling each dimension is performed based on a weighted random sampling process.

4. The method of claim 1, wherein generating the traffic prediction comprises:
    receiving a first traffic prediction from the first base predictor; and
    receiving a second traffic prediction from the second base predictor.

5. The method of claim 1, wherein the first dimension set is received from a base station.

6. The method of claim 1, wherein the first base predictor comprises a linear regression base predictor.

7. A system, comprising:
    a memory storing instructions; and
    a processor configured to execute the instructions to:
        receive a first dimension set;
        extract a first latent feature set from the first dimension set;
        train a first base predictor based on the first latent feature set;
        generate a second dimension set based on the first dimension set, the second dimension set having fewer dimensions than the first dimension set;
        extract a second latent feature set from the second dimension set;
        train a second base predictor based on the second latent feature set; and
        generate a traffic prediction based on the first base predictor and the second base predictor,
    wherein the processor is configured to execute the instructions to generate the second dimension set by:
        sampling each dimension in the first dimension set with a predetermined number of runs; and
        determining that dimensions in the first dimension set with a number of occurrences in the predetermined number of runs that is greater than a sampling threshold are to be included in the second dimension set.

8. The system of claim 7, wherein the processor is configured to execute the instructions to generate the second dimension set by:
    determining reconstruction errors for each dimension in the first dimension set; and updating dimension probabilities for each dimension in the first dimension set based on the reconstruction errors.

9. The system of claim 7, wherein sampling each dimension is performed based on a weighted random sampling process.

10. The system of claim 7, wherein the processor is configured to execute the instructions to generate the traffic prediction by:
receiving a first traffic prediction from the first base predictor; and
receiving a second traffic prediction from the second base predictor.

11. The system of claim 7, wherein the first dimension set is received from a base station.

12. The system of claim 7, wherein the first base predictor comprises a linear regression base predictor.

13. A non-transitory computer-readable storage medium storing instructions that, when executed, cause at least one processor to:
receive a first dimension set;
extract a first latent feature set from the first dimension set;
train a first base predictor based on the first latent feature set;
generate a second dimension set based on the first dimension set, the second dimension set having fewer dimensions than the first dimension set;
extract a second latent feature set from the second dimension set;
train a second base predictor based on the second latent feature set; and
generate a traffic prediction based on the first base predictor and the second base predictor,
wherein the instructions, when executed, further cause the at least one processor to generate the second dimension set by:
sampling each dimension in the first dimension set with a predetermined number of runs; and
determining that dimensions in the first dimension set with a number of occurrences in the predetermined number of runs that is greater than a sampling threshold are to be included in the second dimension set.

14. The storage medium of claim 13, wherein the instructions, when executed, cause the at least one processor to generate the second dimension set by:
determining reconstruction errors for each dimension in the first dimension set; and
updating dimension probabilities for each dimension in the first dimension set based on the reconstruction errors.

15. The storage medium of claim 13, wherein sampling each dimension is performed based on a weighted random sampling process.

16. The storage medium of claim 13, wherein the instructions, when executed, cause the at least one processor to generate the traffic prediction by:
receiving a first traffic prediction from the first base predictor; and
receiving a second traffic prediction from the second base predictor.

17. The storage medium of claim 13, wherein the first dimension set is received from a base station.

* * * * *